Dec. 4, 1928.

R. MÜLLER 1,694,228

WORM CONVEYER

Filed April 1, 1927

INVENTOR
RICHARD MÜLLER
BY HIS ATTORNEYS
Howson and Howson

Patented Dec. 4, 1928.

1,694,228

UNITED STATES PATENT OFFICE.

RICHARD MÜLLER, OF SPANDAU, GERMANY, ASSIGNOR TO KRAH & KIRCHHOFF, OF BERLIN, GERMANY.

WORM CONVEYER.

Application filed April 1, 1927, Serial No. 180,291, and in Germany June 22, 1926.

This invention relates to improvements in worm-conveyers.

It has already been proposed, to prevent obstructions in worm-conveyers and the resulting churning of the goods being fed, by the provision of discs adjacent to the worm which engage in the thread of the worm and thereby detach the goods from the latter. As these discs do not take part in the rotation of the worm and must in any case be clear of it they are either arranged so that they project only slightly into the thread of the worm and are pushed aside by the latter or a special device is provided which brings the discs into and out of engagement with the worm. Both arrangements possess the disadvantage that the object in view is only imperfectly attained and, moreover, interruptions in the operation take place in consequence of the complicated construction.

According to the invention these disadvantages are avoided by forming the clearing disc as a toothed disc the toothed profile of which approximately corresponds to that of the worm.

The toothed disc may advantageously be so arranged that it projects into the feed funnel of the conveyer and so functions as a feed.

The drawing shows, by way of example, the invention applied to a meat mincing machine.

In the said drawing—

Figure 1:
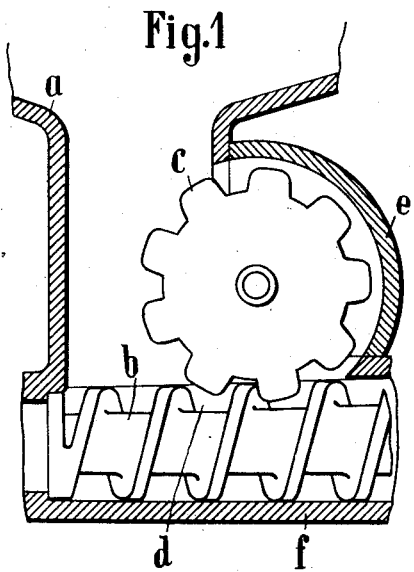
Figure 1 shows a portion of the machine in longitudinal section.
Figure 2:
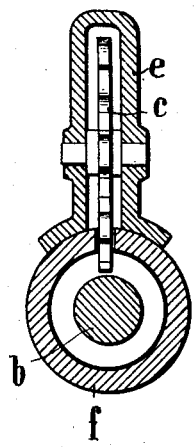
Figure 2 is a cross-section thereof.

The feed goods, in the example shewn meat, are supplied through the filling funnel $a$ to the worm $b$, with the assistance of the disc $c$ serving as a feeder, which engages in the thread of the worm $b$. This disc is enclosed by a cap $e$, whilst the worm is mounted in a housing $f$. The meat is, according to the invention, prevented by a tooth of the disc $c$ from following the rotation of the worm $b$ and is forced forwards in the thread of the worm $b$ between the said worm $b$ and housing $f$. This operation is positively repeated with each rotation of the worm, so that an uninterrupted feed is ensured.

It will be obvious that the invention may also be applied to all other worm-conveyers.

I claim:

In a conveyer, a housing, a screw therein, an inlet to said housing, a toothed wheel engaging with said screw and mounted adjacent said inlet, whereby the toothed wheel aids in feeding material to the screw, and prevents rotation of material in the screw.

In testimony whereof I have signed my name to this specification.

RICHARD MÜLLER.